(12) United States Patent
Wu (10) Patent No.: US 7,416,433 B1
(45) Date of Patent: Aug. 26, 2008

(54) PLUG-IN MODULE WITH LATCH MECHANISM

(75) Inventor: Jerry Wu, Irvine, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/891,472

(22) Filed: Aug. 10, 2007

(51) Int. Cl.
*H01R 13/62* (2006.01)

(52) U.S. Cl. .................. 439/372; 439/352; 439/160

(58) Field of Classification Search ................ 439/352, 439/372, 159–160
See application file for complete search history.

(56) References Cited

U.S. PATENT DOCUMENTS

| | | | | |
|---|---|---|---|---|
| 5,316,495 | A * | 5/1994 | Frantz | 439/372 |
| 6,790,087 | B2 | 9/2004 | Ho | |
| 6,802,744 | B2 | 10/2004 | Chiang | |
| 6,887,091 | B1 * | 5/2005 | Wu | 439/352 |
| 6,991,481 | B1 * | 1/2006 | Guan et al. | 439/160 |
| 2004/0023546 | A1 * | 2/2004 | Wu | 439/352 |
| 2005/0148223 | A1 * | 7/2005 | Shirk et al. | 439/160 |
| 2006/0099836 | A1 | 5/2006 | Ho | |

* cited by examiner

*Primary Examiner*—Truc T Nguyen
(74) *Attorney, Agent, or Firm*—Wei Te Chung (57) ABSTRACT

A plug-in module (100) includes a pair of opposite sidewalls (11, 21) parallel to each other and a latch mechanism (8). The latch mechanism includes a pair of sliders (4), a bail (3) and a pair of ejectors (5). The sliders are sliderably attached to the sidewalls and are configured and arranged to linerear move relative to the sidewalls. The bail is attached to the sidewalls and one ends of the sliders and is configured and arranged such that the rotate motion of the bail results in the linerear movement of the sliders. The ejectors are pivotally attached to the sidewalls and cooperate with the sliders. The ejectors are configured and arranged such that the rotation of the bail results in the linerear movement of the sliders to actuate the ejectors to outwardly rotate relative to the sidewalls adapted for deflecting the latch tab of the module receptacle to separate the plug-in module from the module receptacle.

18 Claims, 12 Drawing Sheets

PLUG-IN MODULE WITH LATCH MECHANISM

BACKGROUND OF THE INVENTION

1. Field of the Invention

The present invention generally relates to a plug-in module, and more particularly to a plug-in module used for high-speed transmission.

2. Description of Related Art

SFP (Small Form-factor Pluggable), X-SFP and QSFP are all modules for fiber optic transmission or signal transmission. All of the modules are of small size or form factor which is important. The smaller the form factor of the module, the less space taken on a printed circuit board to which it couples. A smaller form factor allows a greater number of modules to be coupled onto a printed circuit board to support additional communication channels. However, the smaller form factor makes it more difficult for a user to handle.

When such a module embedded in a system fails, it is desirable to replace it, particularly when other communication channels are supported by other modules. To replace a failed module, it needs to be pluggable into a module receptacle. While, plugging in a new module is usually easy, it is more difficult to remove the failed module because of other components surrounding it. Additionally, a user should not attempt to pull on cables of the module in order to try and remove a failed module or else the user might cause damage thereto.

A typical release method for a pluggable module is to push in on the module itself and then pull out on the module to release it from a cage assembly or module receptacle. It has been determined than this method is not very reliable with users complaining of the difficulty in removing pluggable modules in such manner. Users often complain that traditional methods offer little leverage in getting a sufficient grip on the module when attempting to pull it out of a module receptacle. Another complaint is that traditional actuators used to remove modules are inaccessible or invisible. Other users complain than once released by the traditional method, it is difficult to withdraw the module out of its cage or module receptacle.

Therefore, designers developed different solutions to solve above problems accounted by the users, such as disclosed by U.S. Pat. Nos. 6,851,867, 6,749,448, 6,884,097, 6,908,323, 7,052,306, 6,824,416 and 7090523. The theories of theses patents are substantially the same, that is each module is received in corresponding cage or module receptacle and comprises a pair of sliders with forward ends engaging with tabs of the cage, and a bail or lever capable of rotating to actuate the sliders linearly to separate forward ends of the sliders from the tabs. The action theory of theses patents successfully solve the problems mentioned above. The present invention provides a plug-in module with an improved latch mechanism operating in a theory different from that of these patents while still successfully solving the problems.

BRIEF SUMMARY OF THE INVENTION

Accordingly, an object of the present invention is to provide a plug-in module with improved latch mechanism for unplugging the plug-in module conveniently.

In order to achieve the above-mentioned object, a plug-in module configured for latching engagement with a module receptacle adapted for mounting to a printed circuit board comprises a pair of opposite sidewalls parallel to each other and a latch mechanism. The latch mechanism comprises a pair of sliders, a bail and a pair of ejectors. The sliders are sliderably attached to the sidewalls and are configured and arranged to linerear move relative to the sidewalls. The bail is attached to the sidewalls and one ends of the sliders and is configured and arranged such that the rotate motion of the bail results in the linerear movement of the sliders. The ejectors are pivotally attached to the sidewalls and cooperate with the sliders. The ejectors are configured and arranged such that the rotation of the bail results in the linerear movement of the sliders to actuate the ejectors to outwardly rotate relative to the sidewalls adapted for deflecting the latch tab of the module receptacle to separate the plug-in module from the module receptacle.

Other objects, advantages and novel features of the invention will become more apparent from the following detailed description of the present embodiment when taken in conjunction with the accompanying drawings.

DETAILED DESCRIPTION OF THE INVENTION

Reference will now be made to the drawing figures to describe the present invention in detail.

Figure 1:
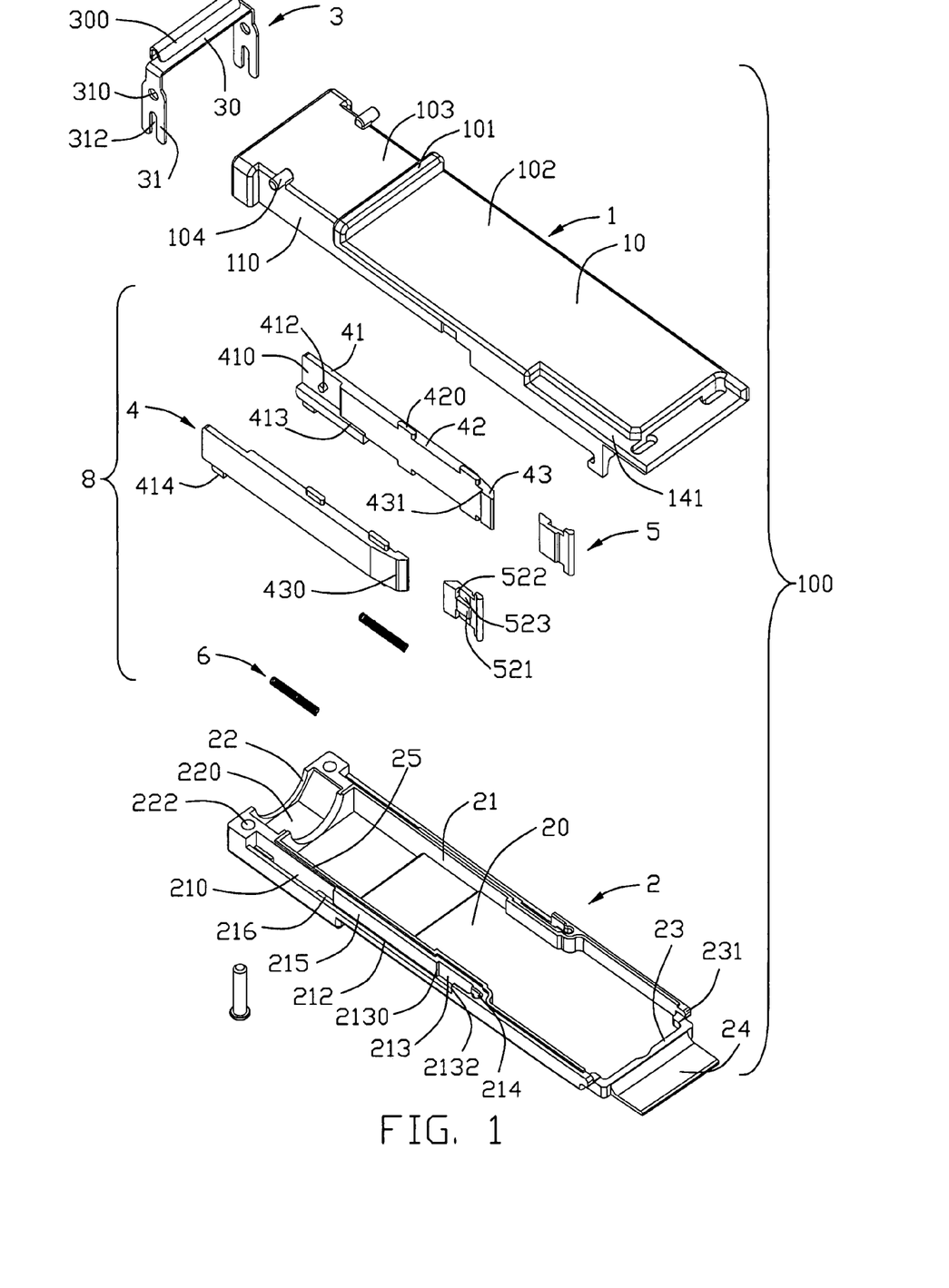
FIGS. 1-3 are exploded, perspective views of a plug-in module in accordance with the present invention and viewed from different aspects.
Figure 2:
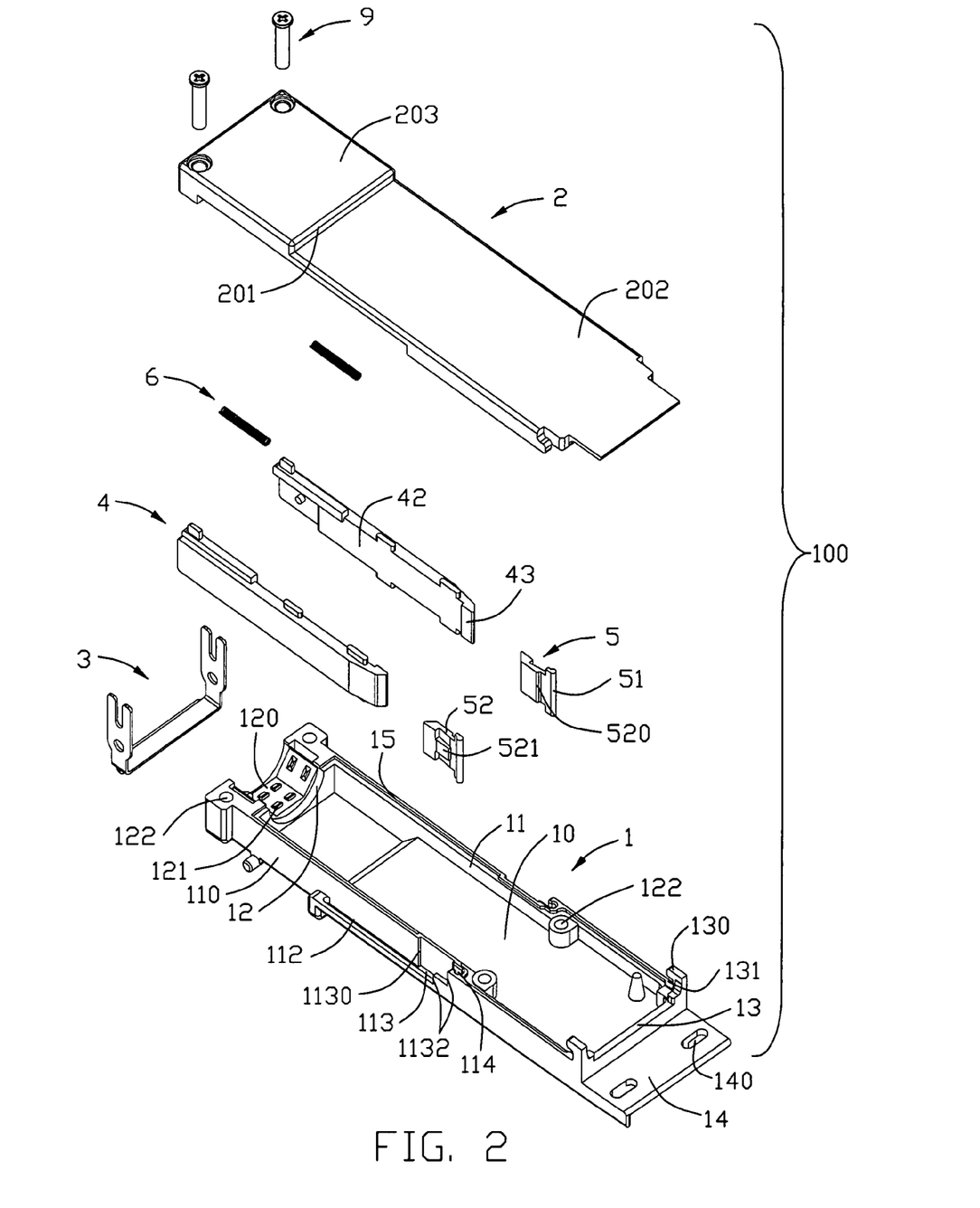
Figure 3:
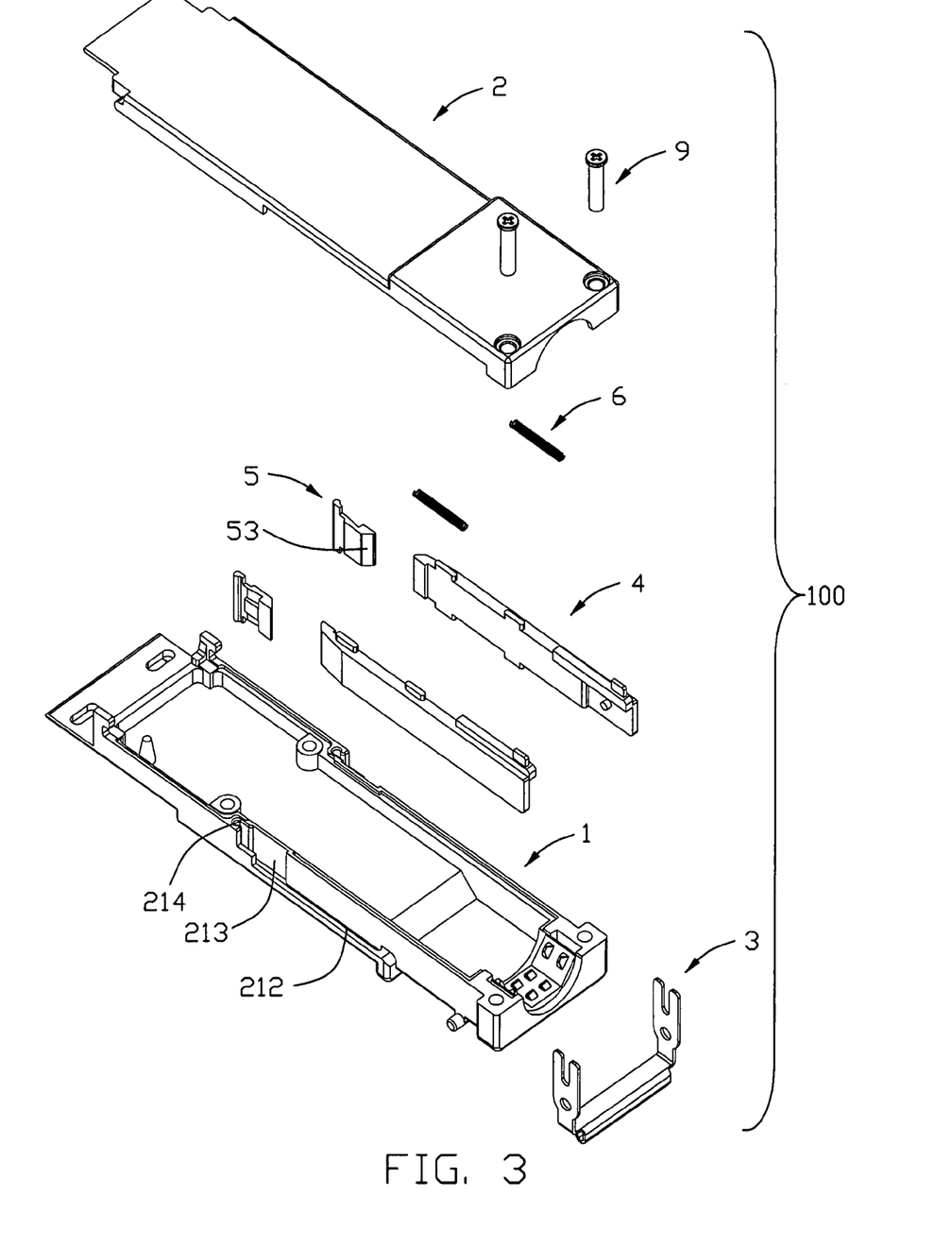

Referring to FIGS. 1-3, a plug-in module 100 in accordance with the present invention comprises a base 2, a cover 1 assembled with the base 2 to form a die case housing 7, and a latch mechanism 8 assembled to the base 2 and the cover 1 for unplugging the plug-in module 100 from a module receptacle (not shown) conveniently. The latch mechanism 8 comprises a pair of die-cast sliders 4 assembled to the base 2 and the cover 1, a pair of die-cast ejectors 5 assembled to the base 2 and the cover 1 and capable of being actuated by the sliders 4, a bail 3 stamped from metal sheet and assembled to the cover 1 and the sliders 4 capable of rotating to actuate the sliders 4 linearly move, and a pair of bias elements 6 assembled to the base 2 and the sliders 4 for providing elastic restoring force to the sliders 4. In the preferred embodiment, the plug-in module 100 is a QSFP (Quad Small Form-factor Pluggable) module in accordance with Revision 1.0 of the QSFP Transceiver specification released on Dec. 1, 2006. However, the plug-in module 100 also can be other types of modules without betray the spirit of the present invention.

The cover 1 comprises a step-shape main upper wall 10, a pair of first sidewalls 11 extending downwardly from opposite side edges of the upper wall 10, opposite first front and rear walls 11, 12 with different heights downwardly extending from front and rear edges of the upper wall 10 and connecting with the pair of first sidewalls 11. The upper wall 10 extends forwardly beyond the first front wall 13 to form a first front flange 14 with a pair of elliptical holes 140 laterally arranged. An L-shape cutout 141 recesses downwardly from upper surface of the upper wall 10 and locates at a left corner of the upper wall 10. A flange 101 is formed on the upper wall 10 to divide the cover 1 into a front first mating section 102 and a rear first installation section 103 which is higher and shorter than the first mating section 102 but lower than the flange 101. The flange 101 indicates the final insertion position of the plug-in module 100.

The opposite first sidewalls 11 are partially cut inwardly to form a pair of first accommodating spaces 110 which extend from a position adjacent to the first rear wall 12 till a middle position of the first mating section 102 corresponding to contours of the sliders 4. The rear section of the first accommodating space 110 before the flange 101 is formed by completely cutting through the first sidewall 11 along up-to-down direction. The front section of the first accommodating space 110 at and after the flange 101 is formed by partially cut the first sidewall 11 along up-to-down direction with upper flange of the first sidewall 11 left and a first sliding slit 112 recessed in the upper flange. A first cooperating recess 113 is recessed inwardly from forward end of the first accommodating space 110 and opens toward outside. A circular first pivot hole 114 recesses upwardly from the first sidewall 11 and communicating with the first cooperating recess 113. The first cooperating recess 113 is of L-shape and communicates with the first pivot hole 114, the first accommodating space 110 and the first sliding slit 112. The first cooperating recess 113 forms an inner first step 1130 and an L-shape outer second step 1132 respectively corresponding to the contours of the sliders 4 and the actuators 5. A pair of rods 104 extend outwardly from outer periphery of the upper wall 10 and locate adjacent to the first rear wall 12. Each rod 104 extends into corresponding first accommodating space 110 for cooperating with the bail 3.

The first rear wall 12 has a relatively large thickness along mating direction and defines a first semicircular exit opening 120 for the exist of a cable (not shown). A plurality of teeth 121 are formed on inner periphery of the first exit opening 120 for interferentially engaging with the cable. A pair of first fastening holes 122 are defined at opposite sides of the exit opening 120. Another pair of first fastening holes 122 are formed in a pair of standoffs formed adjacent to the first pivot holes 114 all for fastening to the base 2. A pair of tips 130 are formed at two corners of the first front wall 13 and below the first front wall 13 to form a pair of spaces 131 between the bottom surfaces of the first sidewalls 11. A continuous slot 15 recesses upwardly from inner edges of the first sidewalls 11 and the first rear wall 12.

The base 2 comprises a step-shape bottom wall 20, a pair of second sidewalls 21 extending upwardly from opposite side edges of the bottom wall 20, opposite second front and rear walls 22, 23 upwardly extending from front and rear edges of the bottom wall 20 and connecting with the pair of second sidewalls 21.

The bottom wall 20 comprises a front second mating section 202 and a rear second installation section 203 lower than the second mating section 202 to form a second flange 201 therebetween for indicating the final insertion position of the plug-in module 100 together with the first flange 101. The second rear wall 22 has a relatively large thickness along the mating direction and partially cut to form a semicircular second exit opening 220 which cooperates with the first exit opening 120 to form an exit channel 70 (FIG. 7) for the exist of the cable (no shown). The second rear wall 22 also defines a pair of circular second fastening holes 222 at opposite sides of the second exit opening 220 corresponding to the first fastening holes 122 for a pair of screws 9 protruding therethrough to fasten the base 2 with the cover 1. The bottom wall 20 extends beyond the second front wall 23 to form a second front flange 24 parallel spaced from the first front flange 14 with a front end of a printed circuit board (not shown), which is accommodated between the base 2 and the cover 1, exposed between the front flanges 14, 24.

Figure 12:
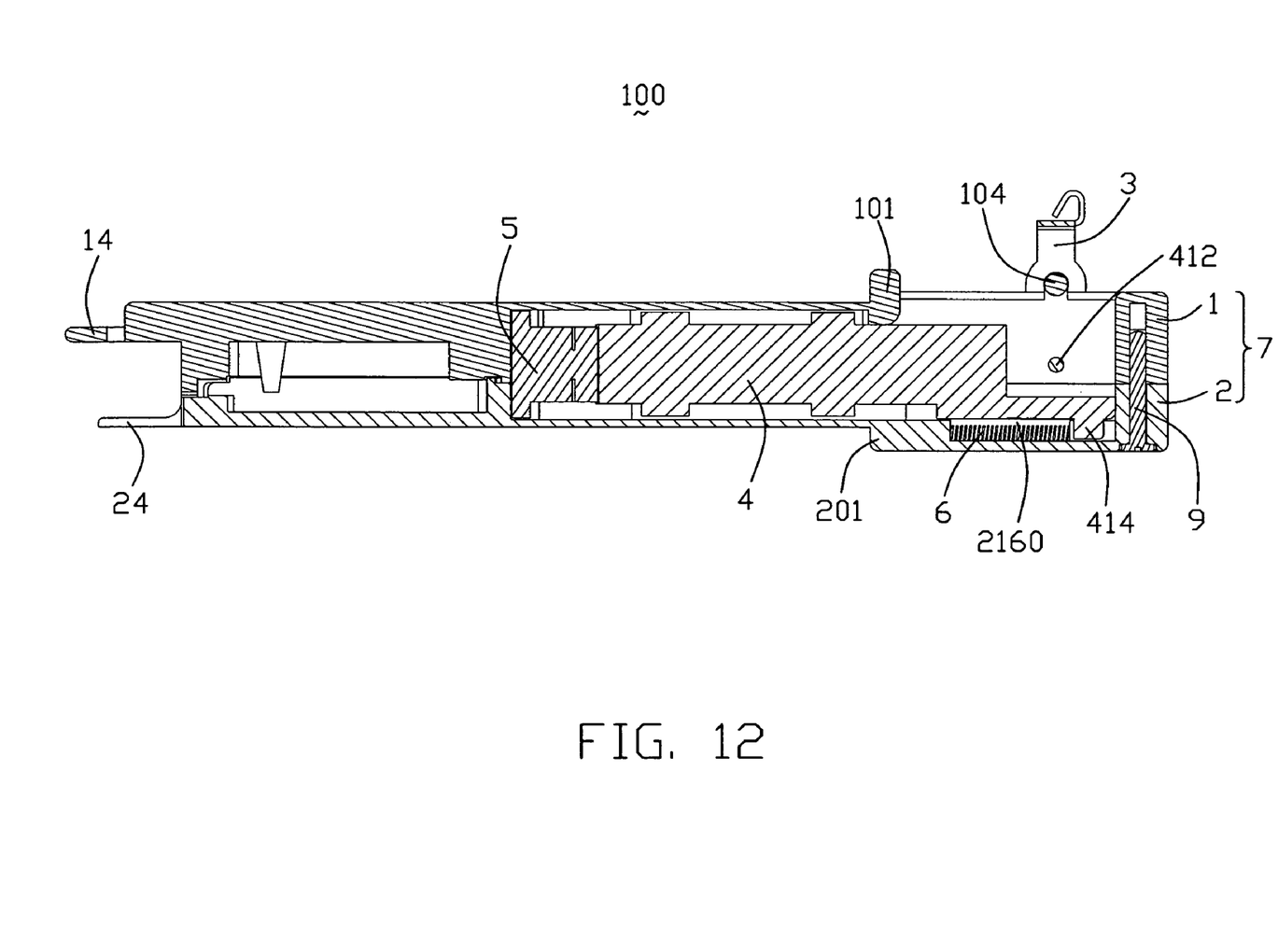

Each second sidewall 21 has different thicknesses along the mating direction of the plug-in module 100. The middle and rear sections of the sidewall 21 are thicker than front section of the sidewall 21 and form the thicker section of the sidewall 21 and the front section is a thinner section of the sidewall 21. The thicker section is partially cut to form a second accommodating space 210 which opens toward outside corresponding to the first accommodating space 110 of the cover 1 to corporately form an accommodating channel 71 of the plug-in module 100 to receive the sliders 4. A protruding block 215 protrudes outwardly from middle section of the inner part of the sidewall 21 to divide the second accommodating space 210 into a rear wider receiving section, a middle second sliding slit 212 corresponding to the first sliding slit 112 and a front second cooperating recess 213 corresponding to the first cooperating recess 113. A second pivot hole 214 is defined in a front end of the thicker section of the second sidewall 21 corresponding to the first pivot hole 114 and communicates with the second cooperating recess 213. Corresponding to the first and second steps 1130, 1132, the second cooperating recess 230 forms an inner first step 2130 on inner part of the second sidewall 21 and an outer second step 2132 on outer part of the second sidewall 21. A continuous rib 25 forms on inner periphery of the pair of second sidewalls 21 and the second rear wall 22 for being received in the continuous slot 15. A pair of tips 231 extends forwardly from forward ends of the pair of second sidewalls 21 and locates above the second front wall 23. A deeper bias receiving slot 2160 (FIG. 12) recesses downwardly from the second accommodating space 210 before the protruding block 215 with a pair of restriction ribs 216 formed at opposite sides of the bias receiving slot 2160 to restrict the movement of the bias element 6. Particularly, the restriction rib 216 adjacent to the second rear wall 22 is divided into two parts by an aligning slit (not shown) for cooperating with the slider 4.

The pair of sliders 4 are arranged face-to-face to be assembled to the base 2 and the cover 1. Each slider 4 comprises a rear mounting portion 41, a middle main body 42 and a front leading end 43. The mounting portion 41 is partially cut to define a cutout 410 on interior surface thereof and forms a pin 412 in the cutout 410. A lower supporter 413 is formed below the cutout 410 and part of the main body 42 with a foot portion 414 downwardly extending therefrom and adjacent to a rear end of the slider 4. The main body 42 is a rectangular body with two pairs of guiding portions 420 formed on upper and lower edges thereof adjacent to interior surface thereof. One pair of guiding portions 420 aligning with each other along vertical direction is in a middle position of the main body 42 and the other pair locates adjacent to the leading end 43. The leading end 43 forms an actuating surface 430 on outer surface thereof and a step-shape latch 431 on inner surface thereof.

The pair of ejectors 5 are assembled to the base 2 and the cover 1 to be actuated by the sliders 4 for releasing the plug-in module 100 from the module receptacle. Each ejector 5 comprises a front pivot 51 vertically arranged for being received in the first and second pivot holes 114, 214, and a main portion 52 extending rearwardly from the pivot 51 with an inclined surface 53 formed at distal end of the main portion 52. The main portion 52 comprises an inner surface and an opposite outer surface. A first block rib 520 is formed on the inner surface of the main portion 52 and adjacent to the pivot 51 and a pair of wedge-shape cutouts 523 is defined at upper and lower sections of the main portion 52 to form a bridge 521 and a pair of bottom second block ribs 522.

The bail 3 is of U-shape and comprises a transverse handle portion 30 formed with a curved grasp section 300 thereon, and a pair of drive arms 31 extending downwardly from opposite sides of the handle portion 30 for cooperating with the cover 1 and actuating the sliders 4 to forwardly move and cause the ejectors 5 outwardly move to separate the plug-in module 100 from the module receptacle. Each drive arm 31 defines a circular hole 310 in an upper section thereof and a U-shape railway 312 communicating with bottom edge thereof.

Figure 4:
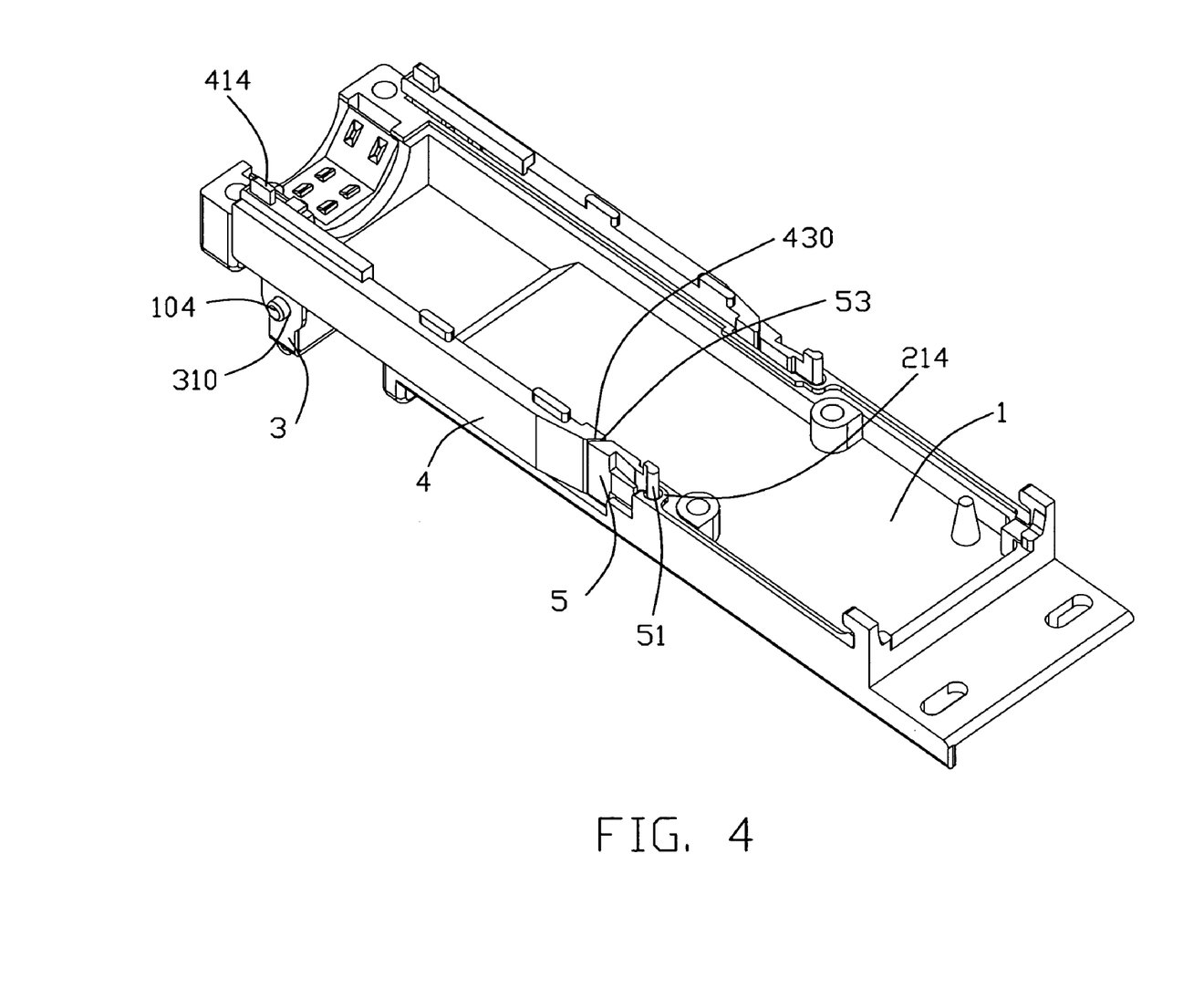
FIGS. 4-5 are partially assembled views of FIGS. 2-3.
Figure 5:
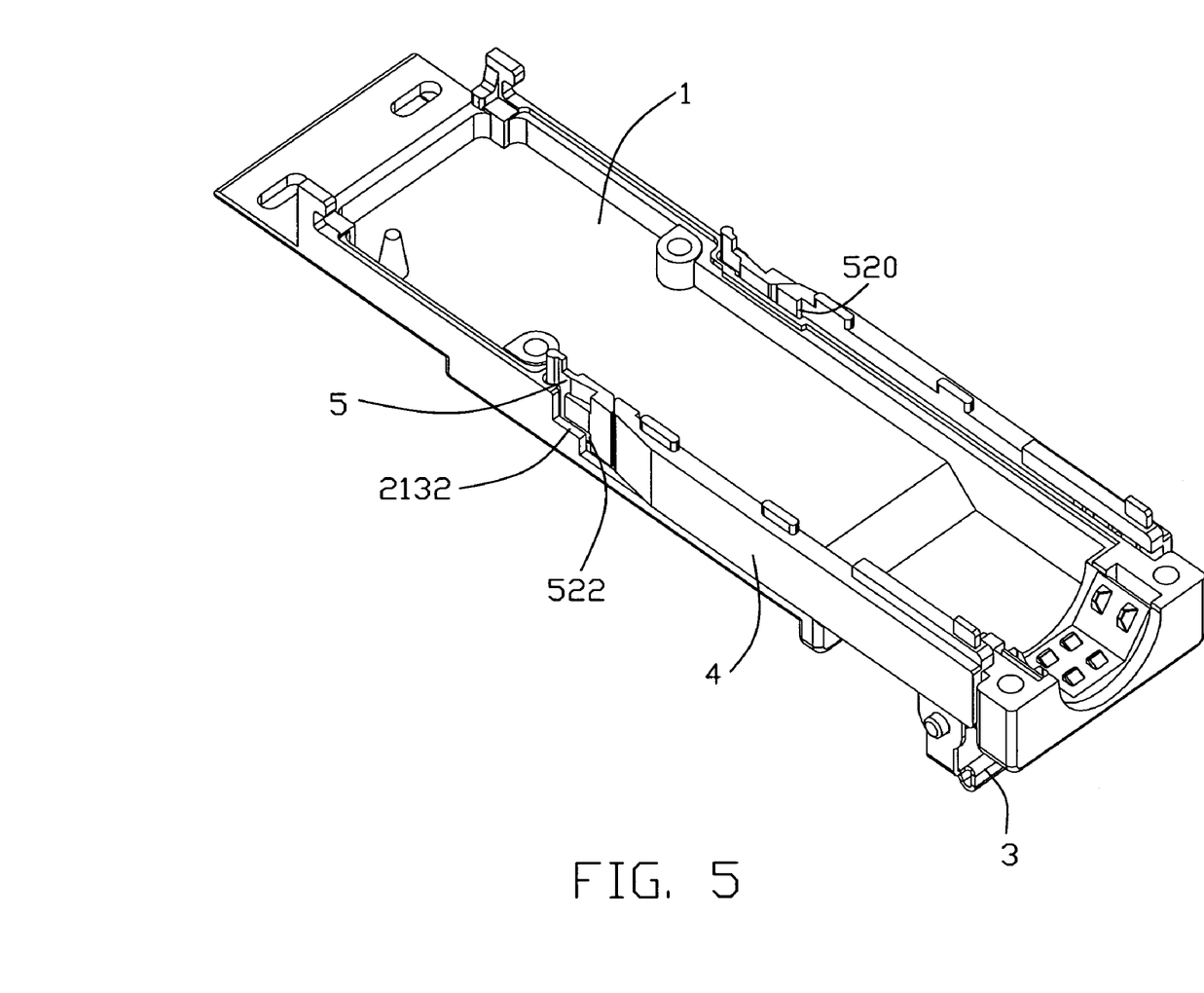

In assembly, referring to FIGS. 4-5 in conjunction with FIGS. 1-3, the bail 3, the sliders 4 and the ejectors 5 are firstly assembled to the cover 1. The bail 3 is firstly assembled to the cover 1 with the pair of rods 104 of the cover 1 inserting into the circular holes 310 of the drive arms 31 and the railways 312 extend into the first accommodating spaces 110. Then, the sliders 4 are assembled to the cover 1 along down-to-up direction. The upper portions of the sliders 4 occupy the first accommodating spaces 110 with outer surfaces of the sliders 4 substantially coplanar with the outer surfaces of the first sidewalls 11. The pair of pins 412 of the mounting portions 41 of the sliders 4 protrude into the railways 312 and the upper pair of guiding portions 420 are received into the first sliding slit 112 and capable sliding along the first sliding slit 112. The upper sections of the leading ends 43 are received in the first cooperating recess 113 with the latches 431 latching with the first step 1130. The ejectors 5 are assembled to the cover 1 with the pivots 51 inserted into the first pivot holes 114 and the main portion 52 occupying the left spaces of the first cooperating recesses 113. In such circumstances, the actuating surfaces 430 of the sliders 4 attach to the inclined surfaces 53 of the ejectors 5 in the first cooperating recess 113 without clearance. The L-shape second step 1132 abuts against the bridge 521 and the second block rib 522.

Figure 6:
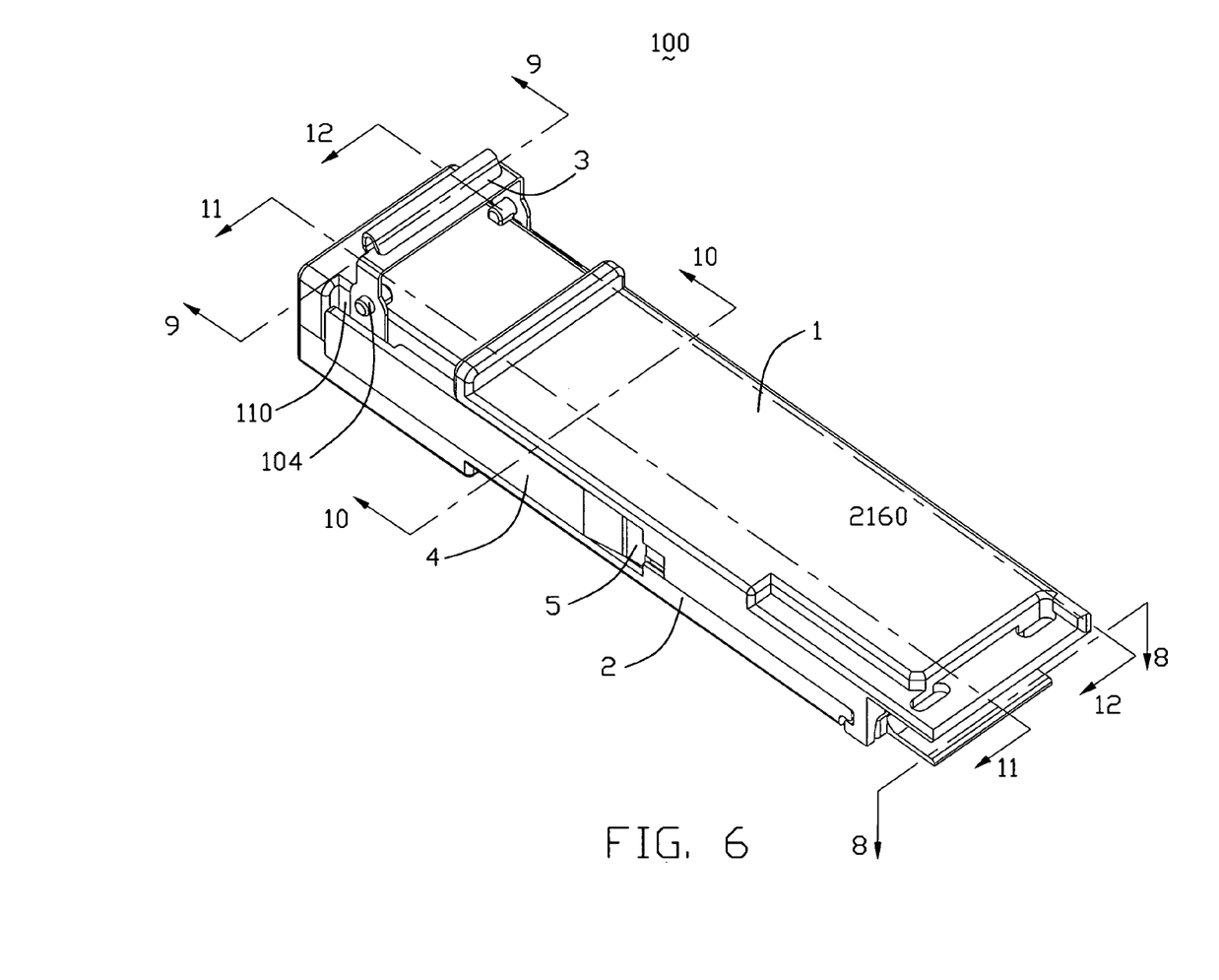
FIGS. 6-7 are assembled views of the plug-in module of FIGS. 1 and 3.
Figure 7:
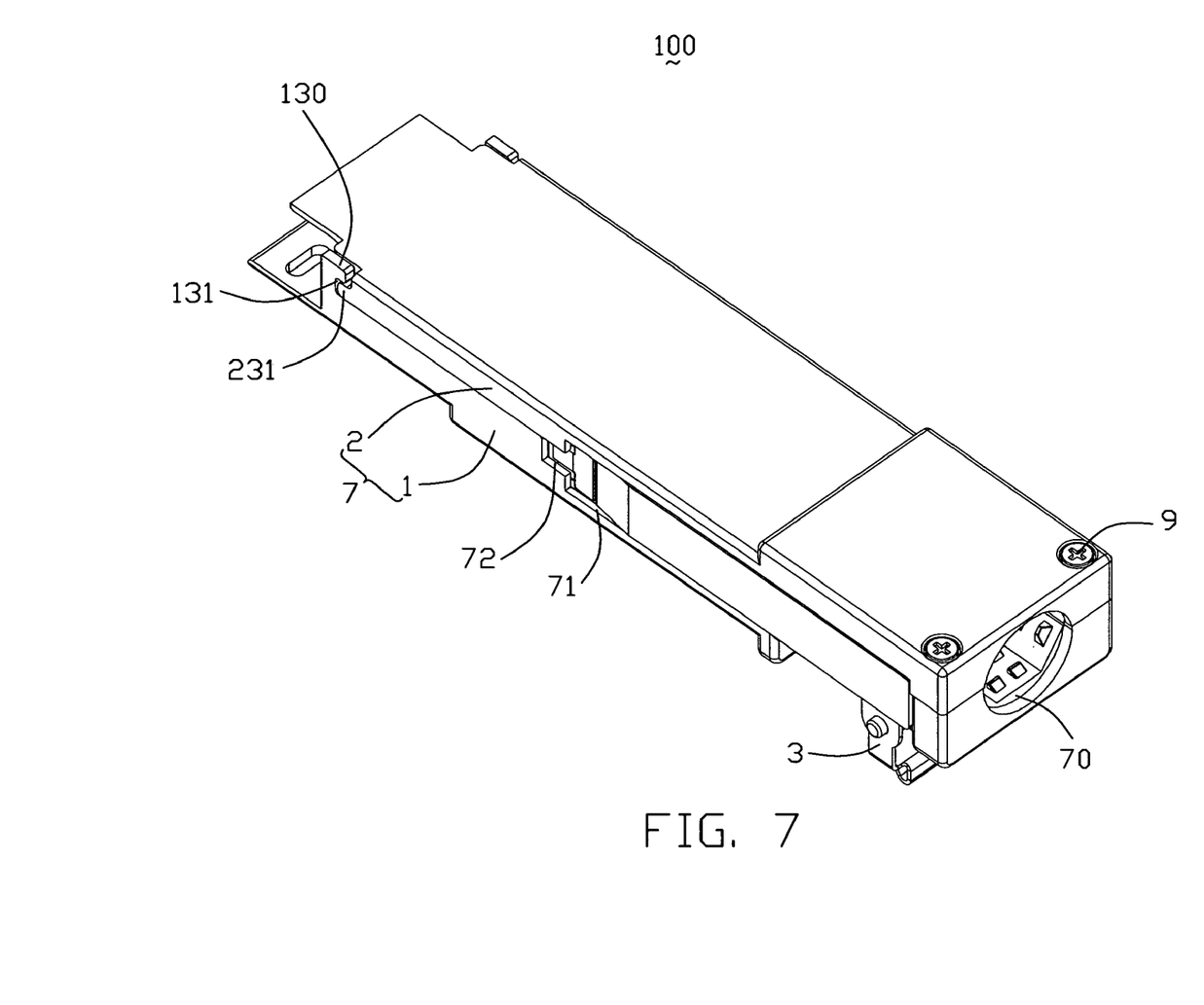
Figure 8:
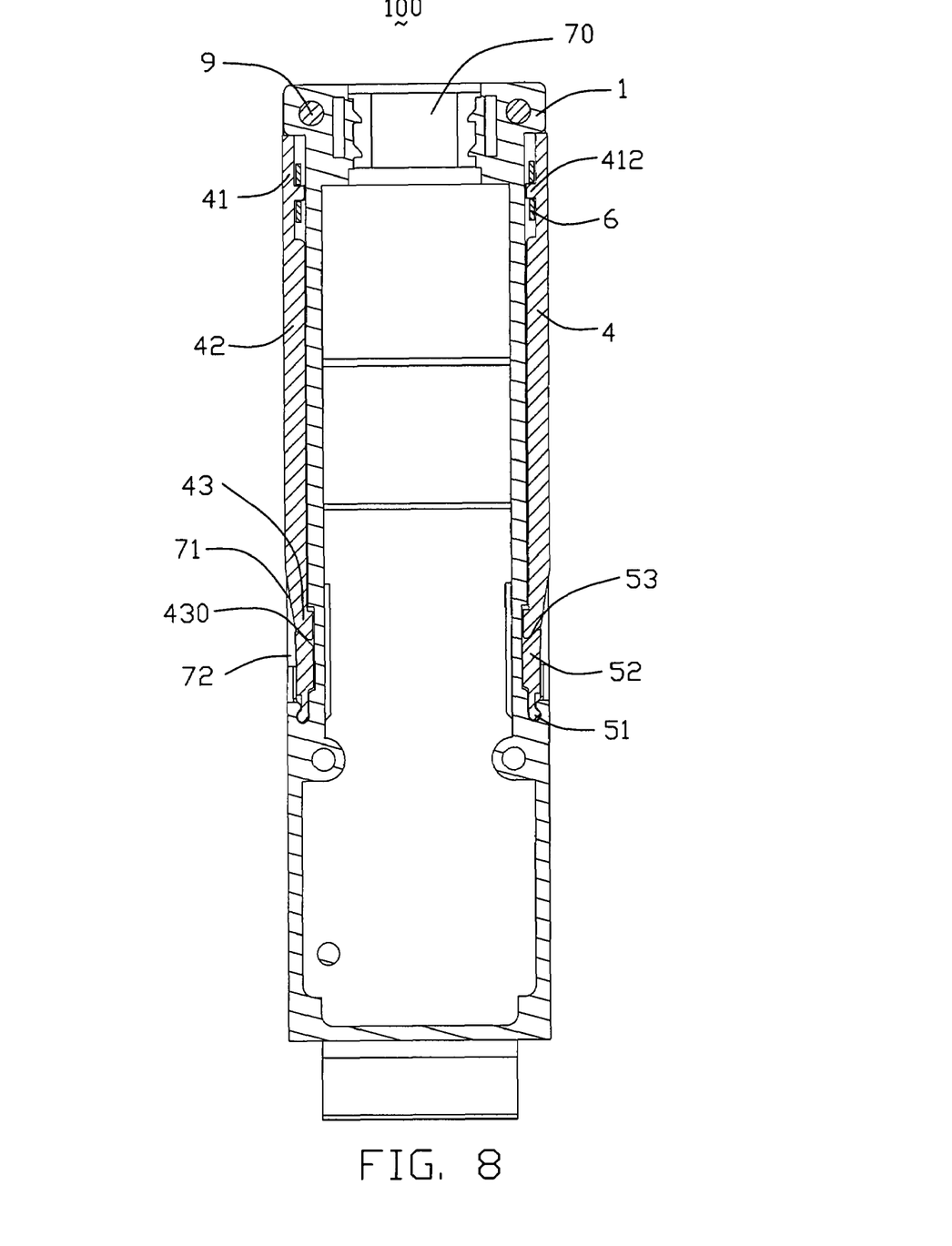
FIGS. 8-12 are cross-section views of the plug-in module taken along lines 8-8 to 12-12 of FIG. 6.
Figure 9:
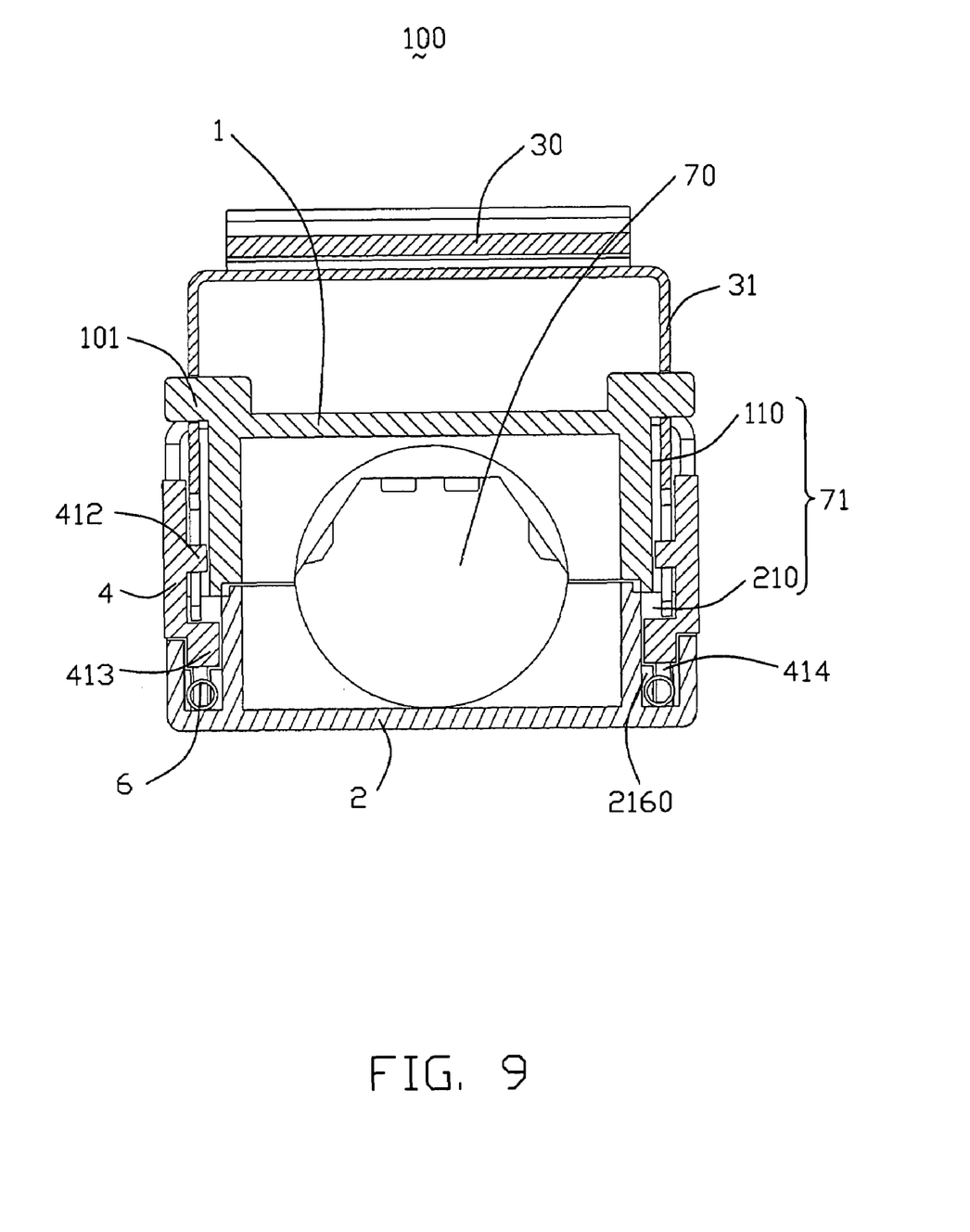
Figure 10:
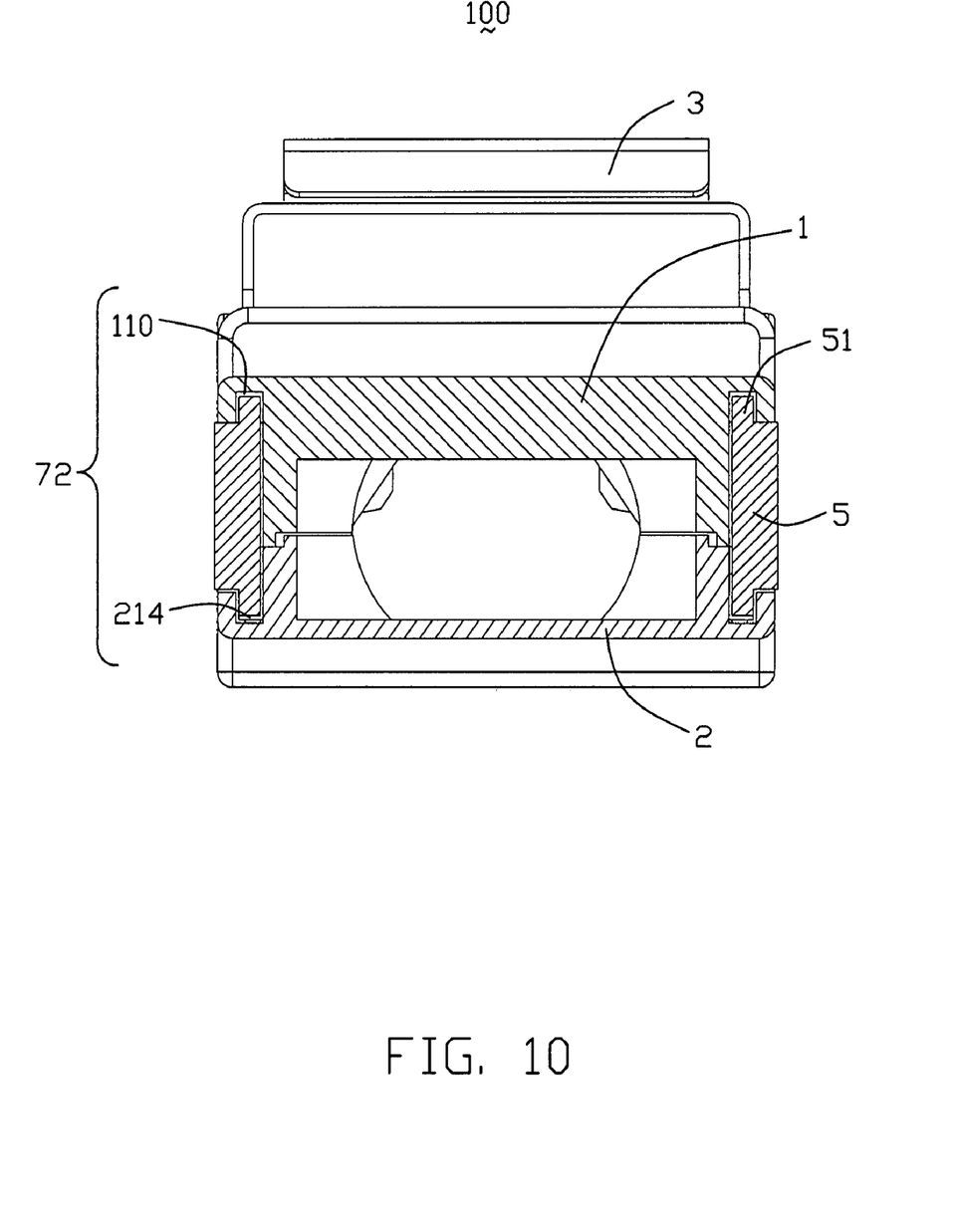
Figure 11:
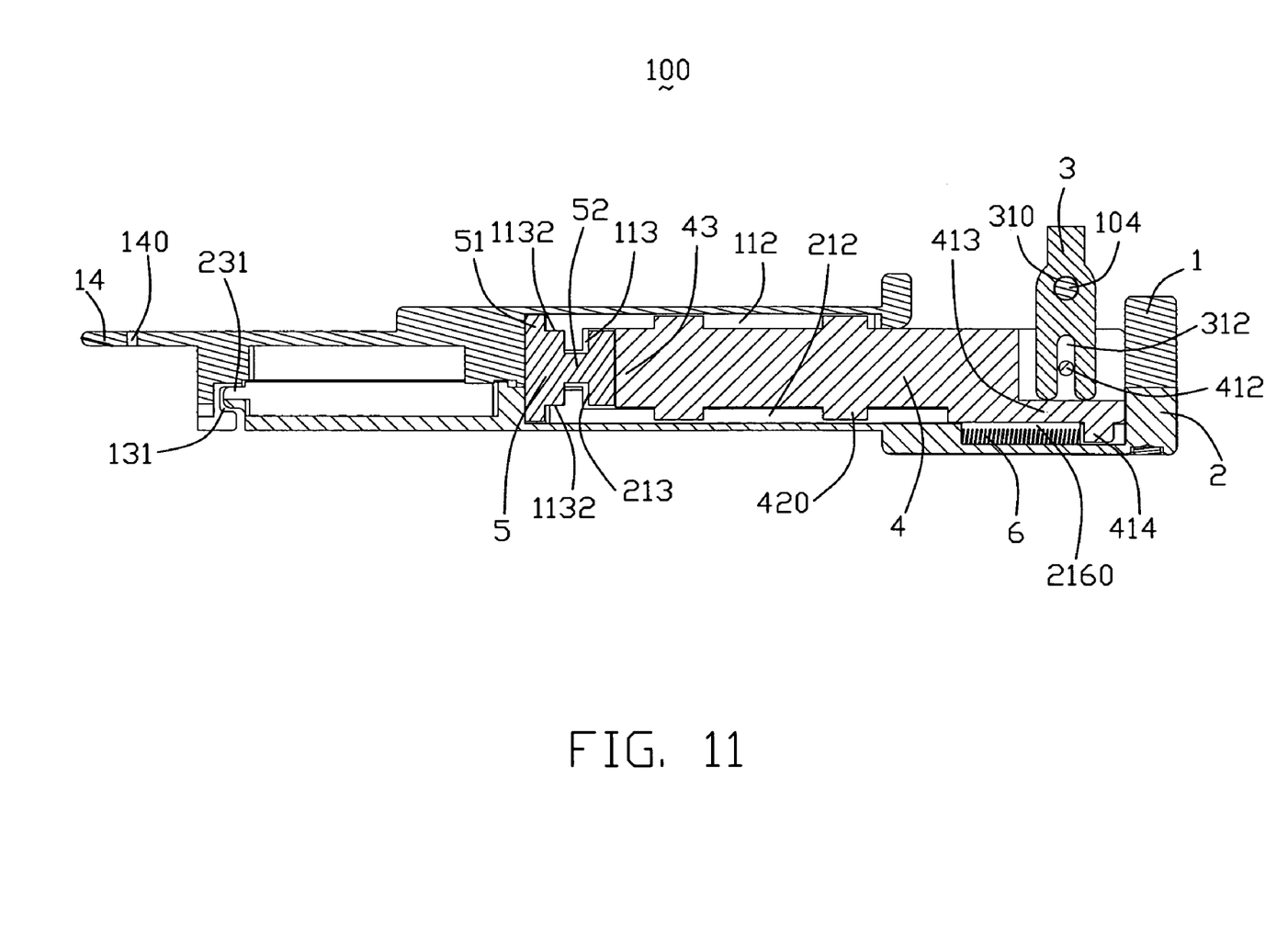

Referring to FIGS. 6-7 in conjunction with FIGS. 1-3 and 8-12, the pair of bias elements 6 are firstly assembled to the base 2 and received in the bias receiving slots 2160 with opposite ends elastically abutting against the pair of restriction ribs 216. The base 2 is then assembled to the cover 1, the sliders 4 and the ejectors 5 together with the pair of bias elements 6 with the pair of tips 231 inserted into the spaces 131 of the cover 1 then rotating the base 2 a certain angle to combine the base 2 and the cover 1 into the housing 7. The lower sections of the sliders 4 and the ejectors 5 occupy the second accommodating space 210, the second cooperating recess 213 and the second pivot hole 214 in a manner similar to the assembly described above. The foot portion 414 of the mounting portion 51 is received in the slit (not shown) to abut against one end of the bias element 6 for compressing the bias element 6 and the pair of guiding portions 420 are received in the second sliding slit 212 and capable of sliding along the second sliding slit 212. The remaining portions of the leading end 423 and the main portion 52 of the ejector 5 are corporately received in the second cooperating recess 213 and the remaining portion of the pivot 51 is received in the second pivot hole 214.

After the above assembly, the plug module 100 is achieved. The first and second accommodating spaces 110, 210 corporately form the accommodating channel 71 of the housing 7 to receive the sliders 4, and the first and second cooperating recesses 113, 213 corporately form a cooperating space 72 of the housing 7 which is commonly used by the sliders 4 and the ejectors 5. The bail 3 is located in a vertical first position when the plug-in module 100 mates with the module receptacle. When removing the plug-in module 100 from the module receptacle, operator may grasp the handle portion 30 of the bail 3 and exerts a rearward force to the bail 3 till to a second position. The bail 3 rotates around the rods 104 along counter-clockwise direction, while the pins 412 received in the railways 312 together with the sliders 4 move forwardly with the guiding portions 420 sliding along the first and second sliding slits 112, 212 and the foot portions 414 compressing the bias elements 6. Thus, the actuating surface 430 slides along the inclined surface 53 of the ejector 5 to actuate the main portion 52 of the ejector 5 outwardly move with the pivots 51 rotating in the first and second pivot holes 114, 214. The outwardly moving main portions 52 push tabs of the module receptacle then escape from the latch condition with the tabs, operator may pull the bail 3 rearwardly to pull the plug-in module 100 from the module receptacle. When release the pulling force to the bail 3, the compressed bias elements 6 resume to their original statement, thus, providing elastic restore force to the sliders 4 and the ejectors 5.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A plug-in module configured for latching engagement with a module receptacle adapted for mounting to a printed circuit board, comprising:
    opposite sidewalls parallel to each other; and
    a latch mechanism comprising:
        a pair of sliders sliderably attached to the sidewalls and being configured and arranged to linear move relative to the sidewalls;
        a bail attached to the sidewalls and one ends of the sliders and being configured and arranged such that the rotate motion of the bail results in the linear movement of the sliders; and
        a pair of ejectors pivotally attached to the sidewalls and cooperating with the sliders; and wherein
        the ejectors are configured and arranged such that the rotation of the bail results in the linear movement of the sliders to actuate the ejectors to outwardly rotate relative to the sidewalls adapted for deflecting the latch tab of the module receptacle to separate the plug-in module from the module receptacle;
    wherein each sidewall defines an accommodating channel to accommodate the slider therein, a pivot hole, and a cooperating space communicating with the accommodating channel and the pivot hole, and wherein the ejector forms a pivot rotatable received in the pivot hole and a main portion received in the cooperating space to contact the slider.

2. The plug-in module as claimed in claim 1, wherein each slider forms a leading end received in the cooperating space together with the main portion of the ejector.

3. The plug-in module as claimed in claim 1, wherein the slider forms a leading end with an actuating surface on at least one of inner and outer surfaces thereof, and the main portion of the ejector forms an inclined surface on at least one of outer and inner surfaces thereof to contact the actuating surface of the slider without clearance, the actuating surface and the inclined surface are such arranged that the actuating surface slides along the inclined surface to actuate the ejector outwardly rotate relative to the sidewall when the slider linear moving.

4. The plug-in module as claimed in claim 1, further comprising a base and a cover respectively comprising first and second sidewalls, and wherein the sliders and the ejectors are respectively sliderably and rotatably attached to the first and second sidewalls of the base and the cover, and the bail is rotatably attached to the cover.

5. The plug-in module as claimed in claim 4, wherein the base and the cover respectively define a pair of first sliding slits and a pair of second sliding slits in first and second sidewalls, and wherein each slider forms at least one pair of guiding portions received in opposite first and second sliding slits can capable of sliding along the first and second sliding slits.

6. The plug-in module as claimed in claim 4, wherein the bail comprises a handle portion and a pair of arms extending downwardly from the handle portion and defining a pair of circular holes and a pair of railways opening downwardly, and wherein the cover forms a pair of rods respectively rotatably received in the circular holes of the bail, and each slider forms a pin sliderably received in the railways.

7. The plug-in module as claimed in claim 4, further comprising a pair of bias elements received in the base and being arranged to be compressed by the sliders for providing elastic restoring force to the sliders.

8. The plug-in module as claimed in claim 7, wherein each slider forms a foot portion on lower edge thereof to compress corresponding bias element.

9. A plug-in module configured to be selectively received within a module receptacle having opposite sidewalls and a latch mechanism configured to interact with corresponding structure of the module receptacle, the latch mechanism comprising:
  a pair of sliders sliderably attached to corresponding sidewall and configured and arranged such that the sliders are capable of linear movement relative to the sidewall, each slider comprising a leading end formed an actuating surface on at least one of opposite inner and outer surfaces thereof;
  a pair of ejectors rotatably attached to the sidewalls and configured and arranged such that the linear movement of the sliders results in the outward rotation relative to the sidewalls, each ejector comprising a pivot configured to be rotatably assembled to the sidewall served as a rotating shaft and a main portion extending from the pivot toward the slider, the main portion forming an inclined surface on at least one of opposite outer and inner surfaces to contact the actuating surface of the slider without clearance; and wherein
  the linear movement of the sliders relative to the sidewalls of the plug-in module result in the movement of the actuating surfaces sliding along the inclined surfaces of the ejectors to cause the ejectors outwardly move around the pivot relative to the sidewalls adapted for defecting corresponding structure of the module receptacle to separate the plug-in module from the module receptacle; wherein
  the module further comprising a base and a cover assembled to each other to define a pair of accommodating channels sliderably receiving the sliders, a pair of pivot holes rotatably receiving the pivots of the ejectors, and a pair of cooperating spaces communicating with the accommodating channels and the pivot holes, and
  wherein the leading end of each slider and the main portion of corresponding ejector are corporately received in the cooperating space.

10. The latch mechanism as claimed in claim 9, further comprising a bail assembled to the sliders and the sidewalls to actuate the sliders linerear move to slide along the inclined surfaces of the ejectors to cause the outward rotation to the ejectors.

11. The plug-in module as claimed in claim 9, wherein further comprising a pair of bias elements accommodated in the base and configured to be compressed by the sliders.

12. The plug-in module as claimed in claim 9, wherein the cover forms a pair of rods exposed in the accommodating channel, and the sliders each forms a pin exposed in the accommodating channel, and wherein the bail comprises a handle portion and a pair of arms downwardly extending to cooperate with the rods and the pins.

13. The plug-in module as claimed in claim 9, wherein the base forms a first flange at front end thereof, and the cover forms a second flange at front end thereof and parallel spaced from the first flange.

14. A plug-in module comprising:
  a cover device having opposite side walls parallel to each other; and
  a latch mechanism comprising:
  a pair of slider linearly slidable along the corresponding side walls respectively;
  a bail attached to the cover and pivotal relative to the cover about a first pivot axis, said bail defining one section engaged with a front section of each of the sliders for moving said slider when said bail is rotated about the first pivot axis;
  a pair of ejector attached to the cover and pivotal relative to the cover about a second pivot axis; and
  a rear section of each of the sliders confronts the ejector for deflecting said ejector when the slider is moved;
  wherein each sidewall defines an accommodating channel to accommodate the slider therein, a pivot hole, and a cooperating space communicating with the accommodating channel and the pivot hole, and wherein the ejector forms a pivot rotatable received in the pivot hole and a main portion received in the cooperating space to contact the slider.

15. The plug-in module as claimed in claim 14, wherein said first pivot axis is not parallel to the second pivot axis.

16. The plug-in module as claimed in claim 14, wherein said first pivot axis is perpendicular to said second pivot axis.

17. The plug-in module as claimed in claim 14, wherein a rearward movement of the slider results in an outward movement of the corresponding ejector.

18. The plug-in module as claimed in claim 14, wherein the second pivot axis is located at a rear end of the corresponding ejector.

* * * * *